United States Patent [19]
Masi

[11] 3,829,847
[45] Aug. 13, 1974

[54] OPTICAL MEMORY USING TRAPPED ELECTRONS IN A CRYSTAL OF PHOTOCONDUCTOR MATERIAL

[75] Inventor: James Vincent Masi, Monroe, Conn.

[73] Assignee: Bunker Ramo Corporation, Oak Brook, Ill.

[22] Filed: Dec. 6, 1972

[21] Appl. No.: 312,661

[52] U.S. Cl.. 340/173 LT, 340/173 LM, 350/160 R
[51] Int. Cl. .......... G11c 11/42
[58] Field of Search .......... 307/88 ET; 340/173 LT, 340/173 LM, 173 CC, 173.2, 173 PP; 350/160 R

[56] References Cited

UNITED STATES PATENTS

| | | | |
|---|---|---|---|
| 2,705,903 | 4/1955 | Marshall | 340/173.2 |
| 2,936,380 | 5/1960 | Anderson | 340/173.2 |
| 2,990,473 | 6/1961 | Kallmann | 340/173 PP |
| 3,350,610 | 10/1967 | Yamashita | 340/173 PP |
| 3,374,473 | 3/1968 | Cummins | 340/173.2 |
| 3,460,157 | 8/1969 | Hoyne | 340/173 LM |
| 3,492,660 | 1/1970 | Halverson | 340/173 LM |
| 3,503,050 | 3/1970 | Schools et al. | 340/173 LM |
| 3,517,206 | 6/1970 | Oliver | 340/173 PP |
| 3,587,063 | 6/1971 | Lamberts et al. | 340/173 LM |
| 3,597,072 | 8/1971 | Brown et al. | 340/173 PP |

OTHER PUBLICATIONS

S2805-0114, Erasable optical recording medium reported by Isomet, Optical Spectra, 7/72, pp. 20–21, Vol. 6, No. 8.

*Primary Examiner*—Stuart N. Hecker
*Attorney, Agent, or Firm*—N. Cass; F. M. Arbuckle

[57] ABSTRACT

This invention provides an optical memory for data bits which memory consists of at least one crystal of a stable photoconductor type material such as zinc oxide (ZnO) which material may have its index of refraction change in response to the concurrent application thereto of two energy elements, an electric field of suitable potential and light energy of a first suitable frequency. One of the elements, for example, the electric field, is normally applied to the crystal and the other element, for example light, is selectively applied to spots on the crystal at which it is desired to store bits of information. The index of refraction of each such spot is changed, storing a data bit thereat. This change in index of refraction is detected by, for example, applying a light beam of a different frequency to the crystal and utilizing either an imaging system, or a polarizer and an analyzer to detect the change in index of refraction. Erasure of data may be accomplished by reversing the electric field or by irradiating the crystal with heat or light energy at a longer wavelength than that utilized for read or write. Information may be stored at various depths within the crystal by varying the electric field across the crystal or by generating the field normal to the crystallographic C axis of the crystal and utilizing electrodes at different depths of the crystal to generate the field.

23 Claims, 9 Drawing Figures

PATENTED AUG 13 1974 3,829,847

SHEET 1 OF 2

OPTICAL MEMORY USING TRAPPED ELECTRONS IN A CRYSTAL OF PHOTOCONDUCTOR MATERIAL

OPTICAL MEMORY

This invention relates to a memory for optically storing data bits or other information.

BACKGROUND OF THE INVENTION

Memories presently utilized for the storage of data and other information are normally of two types. First, there are the inexpensive but slow disc, drum and tape memories which may be utilized for storing large quantities of information. With a magnetic disc, for example, as many as $10^9$ bits may be stored on a single disc at a cost of about a tenth of a cent a bit. However, random access time with a magnetic disc memory is in the order of $10^4$ to $10^5$ microsecond.

The second type of memories are the faster but far more costly core and semiconductor memories. Partly as a result of cost, these memories are not normally utilized for storing large quantities of information. Typically, a core memory might storage $10^6$ bits at a cost of about a penny a bit and have a random access time of about 1 microsecond. Semiconductor memories are normally adapted to store about $10^3$–$10^5$ bits at a cost from 1 to 10 cents a bit with a random access time approaching 0.1 microseconds.

From the above it is apparent that there is a wide disparity in cost, speed and capacity between the two different types of memories. Recent developments have suggested that optical memories may provide a vehicle for bridging this gap, prpviding random access times approaching those of core memories with capacities and per bit costs approaching those of disc memories. However, the promise of optical memories, particularly random access optical memories, has not yet been realized in practical, workable systems. One reason why this has been true is that existing optical memories have been constructed of photochromic material and other magneto and electro-optic effect materials. These materials require a relatively high energy input in order to be sensitized. Typically, a photochromic material requires $3 \times 10^4$ microjoules per square centimeter for the recording of information. Since, because of their coherent light output, lasers are normally utilized for recording in optical memories, the high energy required in order to sensitize existing optical memories requires that relatively expensive high-energy output lasers be utilized and/or that the area to be sensitized be exposed to the write beam or a relatively long period of time. The latter procedure of course increases the random access time of the memory. Other types of materials, such as photoplastic materials, have long erase times and limited reversal characteristics.

Existing optical memories also store only at the surface of the storage medium resulting in a single "page" of storage. Holographic techniques have permitted the addition of paging capability to these memories. However, techniques for holographic storage and retrieval are relatively complicated and expensive and have yet to be completely perfected. A need therefore exists for a simple mechanism for achieving page storage, or storage at different levels, within an optical memory.

Another feature which is desirable in an optical memory is the ability to erase either the entire memory, selected areas of the memory, or only a single bit. In order to reduce the number of lasers required for utilization with a given memory, it is also desirable to provide a capability for utilizing a single laser for reading, writing, and erasing in the optical memory. Another capability which is desirable in optical memories is the ability to display stored data either directly or indirectly.

SUMMARY OF THE INVENTION

In accordance with the above, this invention provides an optical memory for data bits which memory consists of at least one crystal of a stable photoconductor type material which may have its index of refraction changed in response to the concurrent application thereto of two energy elements, an electric field of suitable potential, and light energy of a first suitable frequency. For preferred embodiments of the invention, the photoconductor material of the crystal is zinc oxide ($ZnO$). The memory also includes means for normally applying one of the energy elements to at least the portion of the crystal in which the data is to be stored, and a means for selectively applying the other energy element to spots of the crystal, the index of refraction of each spot to which the other energy element is applied having its index of refraction changed to store a data bit therein. Finally, the memory includes a means for detecting the change in index of refraction of each spot to which the other energy element is applied.

For preferred embodiments, an electric field is normally applied across the crystal and storage is effected by selectively illuminating spots at which storage is desired with a light beam, such as a laser beam, at the first frequency. Reading is accomplished by applying a light beam at a second frequency to the spots of the crystal and detecting the refraction of the beam as a result of its passing through the spot of the crystal. The detection may be done with an imaging system such as a Schlieren optical system, or the read beam may be polarized and an analyzer utilized to detect the refraction change. Information may be stored at various depths within the crystal by varying the electric field across the crystal, or by generating the field normal to the crystallographic C axis of the crystal and utilizing electrodes at different depths of the crystal to generate the field. Erasure of data may be accomplished by reversing the electric field or by irradiating the crystal with heat or light energy at a longer wavelength than that utilized for the read or write. For one embodiment of the invention a single laser passed through a wavelength selection system is utilized for generating the read, write, and erase light energy.

The foregoing and other objects, features and advantages of the invention will be apparent from the following more particular description of the invention as illustrated in the accompanying drawings.

DETAILED DESCRIPTION

There are presently a number of stable photoconductor materials on the market which may have their index of refraction changed in response to the concurrent application thereto of an electric or magnetic field of suitable potential or strength and light energy at a first suitable frequency. An example of such a material is silicon dioxide doped in a standard manner to become a photoconductor. However, the best photoconductor of this type is zinc oxide (ZnO). This material is an excellent photoconductor and has the additional advantage of having extremely high photo-sensitivity, requiring only 1.6 microjoules per square centimeter of energy in order to be sensitized. Therefore, for purposes of the discussion to follow, the photoconductor materials utilized will be assumed to be ZnO.

Figure 1:
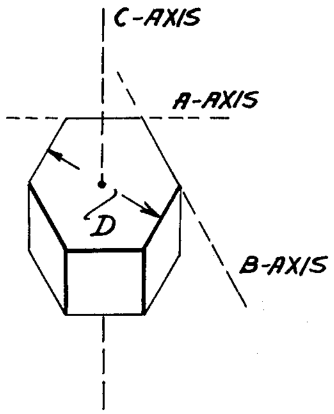
FIG. 1 is a diagram of a single zinc oxide crystal of the type utilized with this invention illustrating the crystal's various axes.

FIG. 1 illustrates the structure of a single crystal of zinc oxide including the various axes of the crystal. From FIG. 1 it is seen that the crystal normally has an hexagonal shape with an A and a B axis along the surface of the crystal and a crystallographic C axis through the crystal. Dimension D of the crystal is normally about one centimeter with the thickness of the crystal being very small, normally in the order of a millimeter or less. For use with this invention the crystal may be cut to a square shape.

Figure 2:
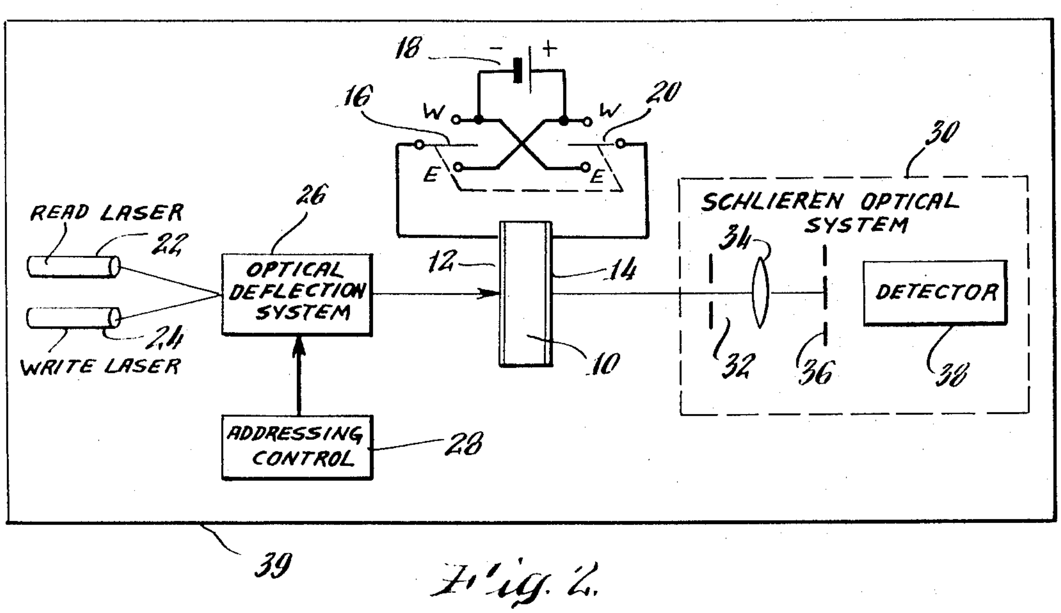
FIG. 2 is a semi-block schematic diagram of an optical memory system of a first embodiment of the invention.

Referring now to FIG. 2, an optical memory system is shown which includes a crystal 10 of ZnO mounted between a pair of transparent electrodes 12 and 14. Crystal 10 may be a single hexagonal or square crystal or several crystals may be mounted side by side for greater storage capacity. Under selected circuit and other conditions, it may also be possible to stack the crystals one behind the other. Electrode 12 is connected through a switch 16 to either the positive or negative terminal of a battery 18. Electrode 14 is connected through a switch 20 to the terminals of the battery. Switches 16 and 20 are ganged. As will be described in greater detail later, when both switches are in their upper position, the crystal 10 is conditioned to be written into while when the switches are in their lower position, the memory is erased. Electrodes 12 and 14 are positioned on the crystal so that the electric field they generate is in a direction parallel to the crystallographic C axis of the crystal.

A read laser 22 and a write laser 24 generate outputs which are applied through an optical deflection system 26 to selected spots on the surface of the crystal 10. Light is also applied to the crystal at an angle substantially parallel to the crystal's crystallographic C axis. The spot on crystal 10 to which system 26 directs the light beam from one of the lasers 22 or 24 is controlled by the input to system 26 received from addressing control circuit 28. Read laser 22 may for example be a helium-neon laser generating an output at 6,328 A while laser 24 may be a helium-cadmium laser generating an output at 4,416 A or 3,250 A. Suitable means are provided for energizing lasers 22 and 24 and for energizing only one of the lasers at a time. Optical deflection system 26 may be one of several existing systems for bending a laser beam and causing it to impinge on a desired spot. Examples of such systems are cousto-optic deflectors and electrically bendable bimorphs.

In operation, switches 16 and 20 are normally in their upper or write position causing a negative potential to be applied to electrode 12 and a positive potential to be applied to electrode 14. Write laser 24 is then energized causing a coherent light beam to pass through optical deflection system 26 to impinge on a spot of crystal 10 at which it is desired to record a bit. The light impinging on the spot creates free electrons in the crystal which are locked in place in an area near the surface of the crystal by the electric field. The excess free electrons at the spot serve to change the crystal's index of refraction in the area of the spot. A bit is thus optically stored in the crystal. The condition of locally changed phase will store indefinitely as long as the electric field is maintained. If the electric field is removed, relaxation or erasure will occur in the dark in from 1 hour to about 24 hours depending on ambient temperature and electrical properties of the crystal such as mobility and doping.

To read the information stored in crystal 10, write laser 24 is turned off and read laser 22 turned on. Addressing control 28 may either cause crystal 10 to be scanned to read out the contents thereof or the information in the crystal may be randomly accessed. The frequency of the read beam is such that, while its light is refracted by any excess free electrons at a bit-storing spot of the crystal, the beam does not itself create free electrons. Nondestructive readout of crystal 10 is thus provided. If a bit is not stored in the accessed spot, the beam passes through crystal 10 unrefracted while, if a bit is stored (i.e., if there are excess free electrons at the spot), the beam passing through the crystal is refracted. In FIG. 2 an optical imaging system 30, which is shown by way of example, as a Schlieren optical system, is utilized for detecting the refraction state of the read beam. Optical system 30 includes the pair of front bars 32, a focusing lens 34, and three back bars 36. An unrefracted beam will impinge on one of the back bars 36, and there will therefore be no output from detector 38 which detector may, for example, be a photodetector. If the beam has been refracted, it does not impinge on one of the bars 36 and an output is obtained from detector 38. A simple, random access memory is thus provided. The memory may be erased by transferring switches 16 and 20 to their lower position reversing the electric field across the crystal. This permits the charges accumulated in the crystal to be swept out through the external circuit.

It should at this point be noted that storage could also be effected with switches 16 and 20 in their lower positions (i.e., a positive potential on electrode 12 and a negative potential on electrode 14). Erasure in this instance is effected by reversing the polarity across the crystal by transferring switches 16 and 20 to their upper positions.

The entire system shown in FIG. 2 is preferably contained within an opaque cabinet 39 so as to eliminate any possibility of ambient light effecting crystal 10, detector 38, or the other elements of the system. However, if necessary, portions of the system, such as for example elements 22, 24, 26 and 28 may be situated outside the cabinet, with light from the laser being applied to the cabinet through a shutter or filter.

The capacity of a memory of the type shown in FIG. 2 is extremely high, the storage density on a single crystal being between $10^6$ and $10^8$ bits-per-square-centimeter. It is thus seen that even with only a single crystal, capacities between those of core and disc memories are obtainable, while with multiple crystals, capacities approaching and even exceeding those of disc memories may be obtained. The access time in the memory is limited primarily by the set-up time of the optical deflection system 26 and would normally be in order of 1 microsecond or less, thus providing access times substantially comparable to those for core memories.

Figure 3:
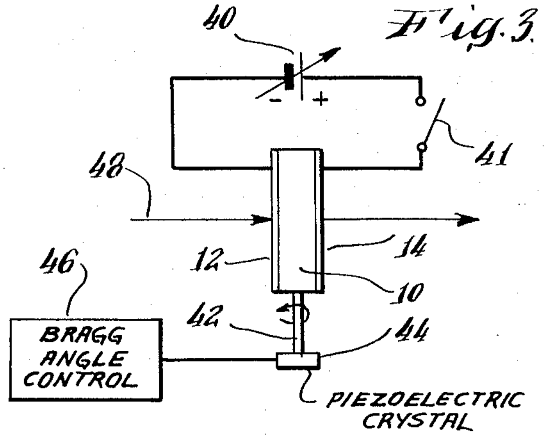
FIG. 3 is a semi-block schematic diagram of a portion of an optical memory system of a second embodiment of the invention.

FIG. 3 illustrates a modified form for the crystal portion of the optical memory system which modified form permits information to be stored at many different levels within the crystal. For this embodiment of the invention, the crystal 10 has transparent electrodes 12 and 14 which are connected to the negative and positive terminals, respectively, of a variable voltage source or regulator 40. While switches 16 and 20 are not shown in FIG. 3, these switches may be utilized with this embodiment of the invention for erasure purposes, or erasure may be effected with this embodiment of the invention using one of the techniques to be described later. Connected in series with regulator 40 is a switch 41 (optional) which permits field to be removed from the crystal if desired. It has been found that assuming an N-type (doped) crystal is utilized, the greater the negative potential at plate 12, the further from this plate into the crystal the created free electrons travel before being locked in by the field. This phenomenon creates the possibility of storing information at a plurality of different levels within a single crystal. If it is assumed that the field required to captivate electrons is roughly equal to $10^3$ volts-per-centimeter thickness of the crystal then, for a 1 millimeter crystal, a 10 volt potential would captivate electrons at the surface of the crystal adjacent plate 12. Increasing the voltage beyond this value would cause the electrons to migrate and be captivated further in the crystal, with the change in position of the electron storage varying as a function of the square root of the change in voltage (for other than a perfect crystal, the change in position may vary as a function of some other fractional exponent). Up to $10^3$ levels within the crystal may be obtained with a crystal 1 millimeter thick. A greater number of levels could of course be achieved with a thicker crystal.

In the discussion above, two problems were not considered. First, the generated light always creates free electrons at the surface of the crystal which electrons are then moved into the crystal under the influence of the electric field before being captivated. It is thus apparent that any attempt to store information at a rear level in a crystal would cause the erasure of all information stored in front of it. Information may thus be stored in the memory only in a predetermined sequence starting with the rear levels and progressing forward (i.e., start with the highest required voltage and decrease the potential for succeeding layers of storage).

In order to permit for the more random storage of information in the memory of FIG. 3, crystal 10 is mounted on a shaft 42 the angular position of which is controlled by a piezoelectric crystal 44. Crystal 44 is energized to position shaft 42 at a desired angle in response to a voltage level obtained from Bragg angle control circuit 46.

In operation, control 46 causes crystal 44 to angularly position shaft 42 and thus crystal 10 so that light 48 from, for example, optical deflection system 26 enters crystal 10 at the proper Bragg angle for the depth level at which information is to be stored. With light entering the crystal at the proper Bragg angle, information in front of the bit which is to be written is not disturbed.

Second, in reading information from a crystal 10 which has information stored at various levels therein, a problem arises in assuring that the read beam is refracted by the desired bit at the proper level. This again is accomplished by having control circuit 46 and crystal 44 rotate crystal 10 so that the read beam enters the crystal at the proper Bragg angle or the level at which information to read is stored. When this is done, the stored information may be easily read and detected in the manner previously described.

Figure 4:
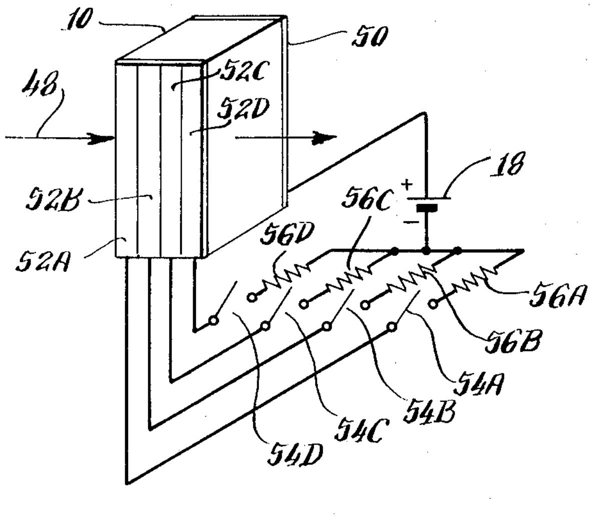
FIG. 4 is an illustration of a portion of an optical memory system for a third embodiment of the invention.

FIG. 4 illustrates another technique which may be utilized for storing information at multiple levels in the crystal 10. For this embodiment of the invention, light 48 for reading or writing the crystal is still applied along the crystallographic C axis of the crystal. However, the electric field is applied by electrodes 50 and 52A–52D normal to the crystallographic C axis rather than parallel to this axis as in the previously described embodiments of the invention. Since light does not pass through electrodes 50 and 52A–52D, these electrodes need not be transparent. Each of the electrodes 52A–52D is connected through a corresponding one of the switches 54A–54D and resistors to the negative terminal of battery 18. The positive terminal of battery 18 is connected to electrode 50.

In operation, only one of the switches 54A–54D is closed at any given time, energizing one of the electrodes 52A–52D to cause electric field to be applied to a particular level of the crystal. When light is applied to the crystal, free electrons are created at the level in the crystal at which electric field exists and are stored at this level. Since free electrons are created only at the selected level and are locked by the field at this level, the Bragg angle control mechanism shown in FIG. 3 is not required for writing. However, in order to read from a particular level in the crystal, the read beam must be applied to the crystal at the proper Bragg angle.

The disadvantages of the embodiment shown in FIG. 4 over that shown in FIG. 3 are (1) the number of levels at which information may be stored in the crystal are significantly less with this technique than that shown in FIG. 3 because of field dispersion and the physical size of the electrodes which limit the number which may be placed on the side of the crystal; and (2) significantly higher potential must be applied across the electrodes when they are positioned normal to the crystallographic C axis as shown in FIG. 4 than is required when they are placed parallel to the crystallographic C axis as shown in the remaining figures. There are thus some significant restrictions in the use of this embodiment of the invention.

Figure 5:
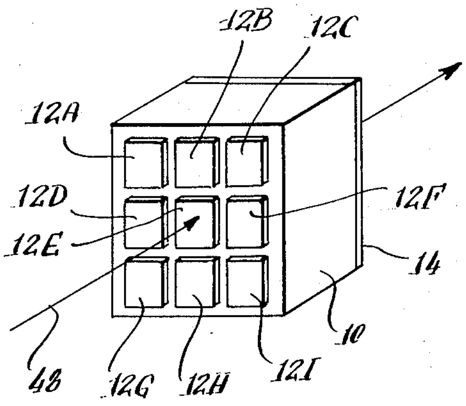
FIG. 5 is an illustration of an optical memory for a fourth embodiment of the invention.

FIG. 5 illustrates another embodiment of the invention which differs from the embodiments shown, for example, in FIGS. 2 and 3 in that negative electrode 12 is divided into a plurality of independently excitable segments 12A–12I, respectively. The number of these segments and their placements may vary with application. With the independent electrode segments 12A–12I, information may be stored and/or erased in a selected area of the crystal 10 without effecting the information in the remainder of the crystal.

Figure 6:
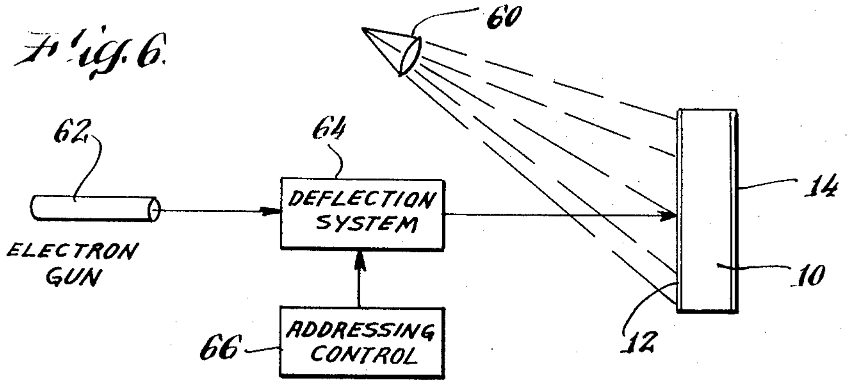
FIG. 6 is an illustration of a portion of the optical memory system of a fifth embodiment of the invention.

FIG. 6 illustrates still another alternative embodiment of the invention which operates in a manner which is substantially the inverse of the operation for the embodiments previously described. With this embodiment of the invention, crystal 10 normally has its surface illuminated with light energy from a filtered lamp 60 or other source of light of suitable frequency. Writing is accomplished with an electron beam of suitable potential from an electron gun 62 which beam is passed through a deflection system 64, such as a deflection yoke, to the surface of crystal 10 causing the creation and captivation of free electrons. Since the light creates free electrons which are locked by the electron beam, storage with this embodiment of the invention is of limited duration requiring periodic refresh. Refresh would normally be required at periods of from 1 to 24 hours depending on factors previously discussed. An addressing control 66 is provided which functions in the same manner as addressing control 28 to direct the electron beam to spots at which writing is to occur. Reading with the embodiment of FIG. 6 is with a light beam, and is accomplished in, for example, the manner shown and described with reference to FIG. 2.

Figure 7:
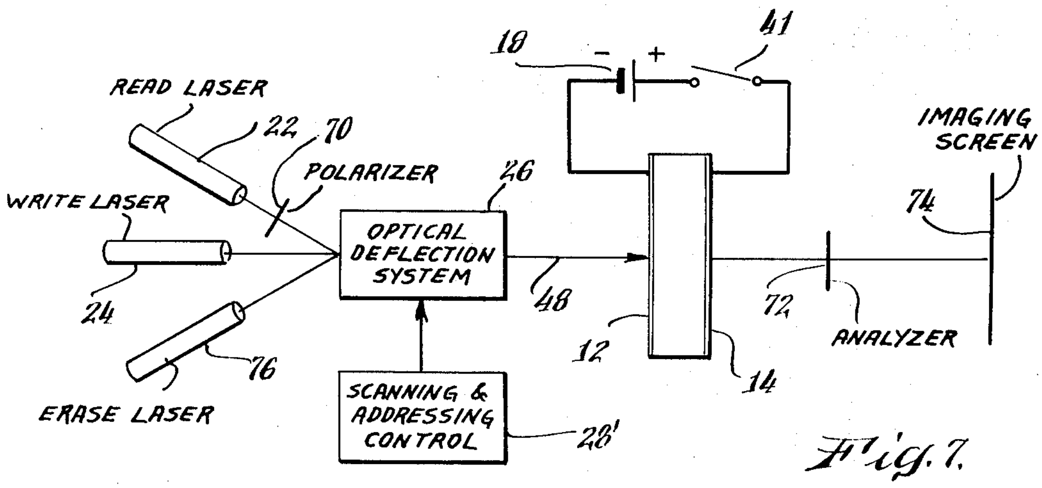
FIG. 7 is a semi-block diagram and illustration of a sixth embodiment of the invention.

FIG. 7 shows an embodiment of the invention having an alternative erase and readout scheme, and also providing visual display of the memory contents. For this embodiment of the invention, crystal 10 has an electric field applied across it by battery 18 through electrodes 12 and 14. Writing is accomplished with a write laser 24 and an optical deflection system 26 in the manner described above with reference to FIG. 2. In the writing operation, scanning and addressing control 28 operates in the same manner as addressing control 28.

For readout, the laser beam from read laser 22 is passed through polarizer 70 before being applied to optical deflection system 26. The phase of the polarized light beam 48 applied to crystal 10 is changed if the spot to which the light beam is applied has free electrons locked therein. This change in phase is detected by analyzer 72. If there is no change in phase, analyzer 72 passes the applied read beam on to either a detector such as photodetector 38 (FIG. 2) or an imaging screen 74 as shown in FIG. 7. Assume, for example, that scanning and addressing control 28' causes the read beam to be sequentially scanned across the face of crystal 10. Under these conditions, the memory position being read out at any given time is known by the position of the beam in its scan at that time. Sequential pulses at the output from a photodetector thus provide a readout of the contents of the memory which may be utilized for any desired purpose including the generating or refreshing of a display device. Imaging screen 74 provides a direct display of the data stored in crystal 10. The configuration shown in FIG. 7 may thus be utilized in place of a conventional memory and cathode ray tube display or in place of a storage tube in the display of any desired type of information.

FIG. 7 also illustrates an alternative means for erasing the contents of crystal 10. With this embodiment of the invention, an erase laser 76 is provided. This laser generates light of much longer wavelength than either the read or write lasers. The erase beam would typically be at a wavelength of from 10,000 to 100,000A. Light at this frequency might for example be obtained from a $CO_2$ laser, a helium-neon laser, or, where an entire crystal is to be erased simultaneously rather than providing for spot erasure as with laser 76, an infrared lamp may be shown on the crystal. The lamp, in addition to providing low frequency, high wavelength light, also heats the crystal. Heating of the crystal is another means of erasing it.

Figures 8, 9:
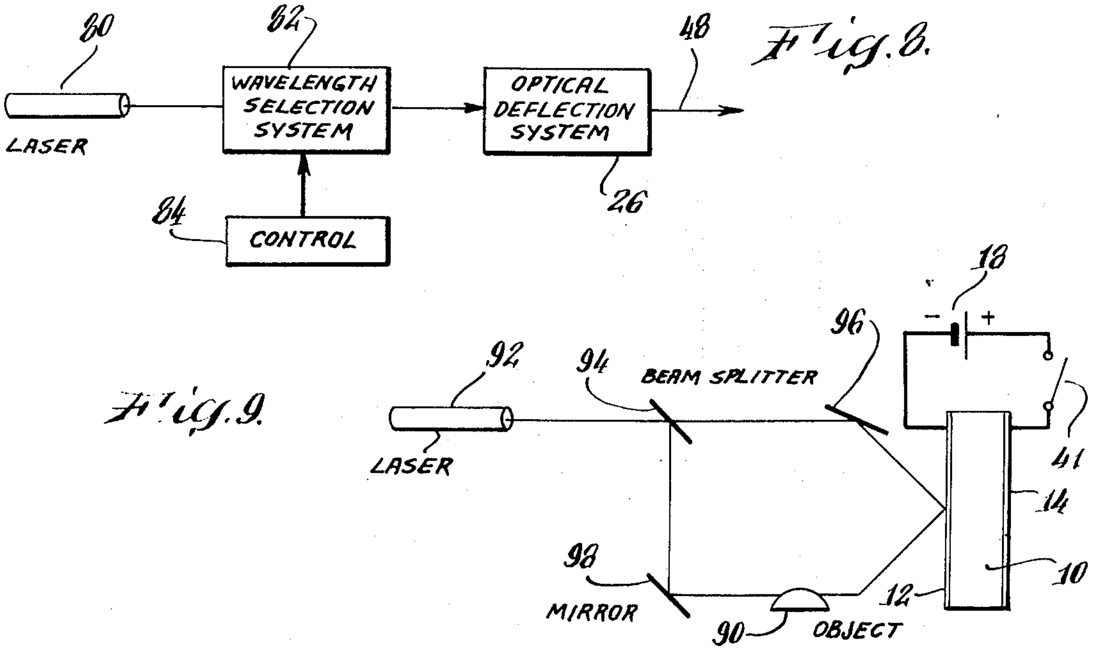
FIG. 8 is a block schematic diagram of a portion of an optical memory system of a seventh embodiment of the invention.
FIG. 9 is an illustration of a portion of an optical memory system for an eighth embodiment of the invention.

FIG. 8 illustrates an embodiment of the invention where a single laser 80 and a wavelength selection system 82 have been substituted for the read, write and erase lasers 22, 24 and 76 shown in FIG. 7. Laser 80 may, for example, be an argon ion laser or a helium-cadium laser either of which is capable of generating an output which may be wavelength selected to provide the required frequencies for read, write and erase. Wavelength selection system 82 may be one of several commercially available systems adapted for performing this function. Examples of such systems are a Littrow prism or a Fabry-Perot etalon selection system. Selection is accomplished in response to an input from control 84 which would normally provide available voltage to System 82. Assuming for example that a helium-cadium-neon laser is utilized, the selection system would generate outputs at 4,416 A. for write, at 6,328 A. for read, and at 33,900 A for erase. Since polarization of only the read beam with the configuration of FIG. 8 may be somewhat difficult detection could be with an imaging optical system 30 such as is shown in FIG. 2.

While in the discussion above it has been assumed that a laser beam is applied to read out information from crystal 10 a bit at a time, with a single detector (for example, 38) being utilized, it is apparent that a beam spreader may be utilized, for example, as part of optical deflection system 26, to cause the read beam to be applied to a block of bits (for example, a 32 by 32 matrix) and that a matrix of photodetectors might be utilized to provide parallel simultaneous read-out of these bits. With an imaging screen 74 as shown in FIG. 7, a block of data, for example a single frame, could be flashed on the screen without requiring the scanning of the laser beam across the crystal, permitting far more rapid read-out of information from the crystal. With the embodiment of the invention shown in FIG. 8, this might permit the laser 80 to be utilized for writing information into the memory, erasure, etc., during the periods between successive displays, the persistence of the eye requiring refresh of the information on the screen to be performed only periodically.

It should also be noted that reading, writing, or erasure may be performed on a content addressable basis as well as in response to random address inputs. To accomplish this, the read beam is scanned in a predetermined manner reading out, for example, addresses or other indexing information from the memory. When a desired item of indexing information (i.e., an address or a name) is located, the write or erase beam is energized or the scanning of the read beam is altered to cause desired information to be read out.

FIG. 9 illustrates that holographic images as well as straight optical data bits may be stored in crystal 10. For writing a holographic image of an object 90 on crystal 10, the beam from a laser 92 is passed through a beam splitter 94, with the direct beam being reflected from a mirror 96 to image on the surface of crystal 10 and deflected beam reflected by mirror 98 through object 90 at the same spot on the crystal. The resulting image may be read out by applying a laser of suitable frequency through beam splitter 94 but applying only the upper portion of the output from the beam splitter to the crystal. The manner in which holographic images are utilized is known in the art. Each image may, for example, represent a page of data, providing an alternative means for paging data to a multilevel storage shown in FIGS. 3 and 4.

An optical memory system has thus been provided which requires minimal power for operation and which is adapted for storing large quantities of information in a single crystal with a capability of increasing the quantity of information stored either by providing several adjacent crystals for the memory, storing data at several different levels within the same crystal, or by storing holographic images of the data on the crystal. In addition to a read and write capability, the system also has the capability of either erasing the entire crystal or selectively erasing bits from the crystal.

While this invention has been described above with respect to various preferred embodiment thereof, it will be understood that the foregoing and other changes in form and detail may be made therein by those skilled in the art while still remaining within the spirit and scope of the invention.

What is claimed is:

1. An optical memory for data comprising:

at least one crystal of a stable photoconductor material of a type which may have its index of refraction changed at a selected spot thereof as a result of the creation of trapped excess free electrons at said spot in response to the concurrent application thereto of an electric field of suitable potential and a light beam of a first suitable frequency;

means for selectively applying a first light beam of a first predetermined frequency to selected spots of said crystal in which data is to be stored for creating excess electrons thereat;

means for concurrently applying an electric field to said crystal for trapping the excess electrons created at each selected spot by said first light beam, the index of refraction of each such spot thereby having its index of refraction changed to thus store a bit of data therein; and means including a second light beam of a second predetermined frequency for detecting the change in index of refraction created at each selected spot, said second predetermined frequency being chosen so that said second light beam is refracted by the trapped excess free electrons at said spot without itself creating free electrons thereat.

2. A memory as claimed in claim 1 wherein said crystal is a zinc oxide (ZnO) crystal.

3. A memory as claimed in claim 1 wherein said electric field is applied in a plane normal to said crystallographic C-axis.

4. A memory as claimed in claim 1 wherein said first light beam is provided by a laser.

5. A memory as claimed in claim 1 including erasing means for reversing the electric field applied to the crystal.

6. A memory as claimed in claim 1 including erasing means for applying heat to said crystal.

7. A memory as claimed in claim 1 including means for shielding said crystal from ambient light.

8. A memory as claimed in claim 1 including erasing means for irradiating said crystal with energy at a third predetermined frequency, said third predetermined frequency being lower than said first and second predetermined frequencies.

9. A memory as claimed in claim 8 wherein said irradiating means is selectively operable to irradiate and thus erase selected data bit storing spots on a crystal.

10. A memory as claimed in claim 8 wherein said crystal is a ZnO crystal;

wherein said first light is applied to said crystal by a laser generating light at 4,416 angstroms; and wherein said irradiating means is a laser generating an output at 33,900 angstroms.

11. A memory as claimed in claim 8 wherein a single laser and a wavelength selection system are provided for generating light energy at said first, second and third frequencies.

12. A memory as claimed in claim 1 wherein the optical axis along which said light beams are applied to said crystal is substantially the crystallographic C-axis of the crystal.

13. A memory as claimed in claim 12 wherein said electric field is applied in a plane parallel to said crystallographic C-axis, said electric field applying means including transparent electrodes for applying said field.

14. A memory as claimed in claim 13 including means for varying the potential of said electric field to vary the depth in said crystal at which data is stored, whereby the storage capacity of a crystal may be increased by storing therein many layers of data.

15. A memory as claimed in claim 14 including means for varying the Bragg angle at which said light beams are applied to the crystal, whereby data may be stored in rear layers of said crystal without disturbing data in the layers in front.

16. A memory as claimed in claim 14 wherein said crystal is a high resistivity N-type crystal;

wherein said means for applying an electric field includes means for applying the field in a manner such that there is a negative charge on the front of the crystal and a positive charge on the rear; and wherein the layer in said crystal at which data is stored is moved to the rear of the crystal by raising the potential of said electric field.

17. A memory as claimed in claim 16 wherein said detecting means includes means for selectively applying said second light beam to said spots of the crystal, and means for detecting refraction of said second light beam caused by its passing through the selected spot of the crystal.

18. A memory as claimed in claim 17 wherein said means for applying said second light beam includes means for polarizing the light; and wherein said refraction detecting means includes means for analyzing the polarization state of the light passed through the crystal.

19. A memory as claimed in claim 17 wherein said detection means includes means for beam spreading said second light beam so as to permit a plurality of spots of said crystal to be simultaneously read out for display on a screen.

20. A memory as claimed in claim 17 wherein said refraction detecting means includes an optical imaging system.

21. A memory as claimed in claim 20 wherein said refraction detecting means includes a Schlierien optical system.

22. A memory as claimed in claim 1 wherein said electric field applying means includes on at least one side of the crystal a plurality of transparent electrodes each covering a separate area of the crystal.

23. A memory as claimed in claim 22 including means for reversing the electric field applied by said electric field applying means through selected ones of said electrodes whereby selected areas of said crystal may be erased without disturbing the remainder of the crystal.

* * * * *